(12) United States Patent
Shi et al.

(10) Patent No.: US 8,402,280 B1
(45) Date of Patent: *Mar. 19, 2013

(54) SYSTEM, METHOD, AND COMPUTER PROGRAM PRODUCT FOR BUFFERING IN ASSOCIATION WITH AUDIO/VIDEO DIGITAL RIGHTS MANAGEMENT (DRM) PROCESSING

(75) Inventors: Haixia Shi, Sunnyvale, CA (US); Xiaohua Yang, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 736 days.

This patent is subject to a terminal disclaimer.

(21) Appl. No.: 12/580,021

(22) Filed: Oct. 15, 2009

(51) Int. Cl.
*G06F 12/14* (2006.01)

(52) U.S. Cl. .......................................... 713/189; 726/26

(58) Field of Classification Search .................... None
See application file for complete search history.

(56) References Cited

U.S. PATENT DOCUMENTS

| | | | |
|---|---|---|---|
| 6,064,739 A | 5/2000 | Davis | |
| 6,598,032 B1 | 7/2003 | Challener et al. | |
| 6,824,051 B2 | 11/2004 | Reddy et al. | |
| 6,961,858 B2 | 11/2005 | Fransdonk | |
| 7,174,021 B2 | 2/2007 | Krishnaswamy et al. | |
| 7,272,858 B2 | 9/2007 | Parks et al. | |
| 7,389,273 B2 | 6/2008 | Irwin et al. | |
| 7,401,230 B2 | 7/2008 | Campbell et al. | |
| 7,440,574 B2 * | 10/2008 | Hanks et al. | 380/281 |
| 7,587,595 B2 | 9/2009 | Scarlata et al. | |
| 7,668,436 B2 * | 2/2010 | Kato et al. | 386/248 |
| 7,971,018 B2 | 6/2011 | Schwemmlein | |
| 8,135,964 B2 | 3/2012 | Shi et al. | |
| 8,266,448 B2 | 9/2012 | Shi et al. | |
| 2002/0073025 A1 | 6/2002 | Tanner et al. | |
| 2003/0217258 A1 | 11/2003 | Bade | |
| 2005/0111663 A1 | 5/2005 | Lotspiech et al. | |
| 2005/0210467 A1 | 9/2005 | Zimmer et al. | |
| 2005/0223220 A1 | 10/2005 | Campbell et al. | |

(Continued)

FOREIGN PATENT DOCUMENTS

| | | |
|---|---|---|
| JP | 2004005585 A | 1/2004 |
| JP | 2005182774 A | 7/2005 |

(Continued)

OTHER PUBLICATIONS

Non-Final Office Action from U.S. Appl. No. 12/331,295, dated Oct. 11, 2011.

(Continued)

*Primary Examiner* — Pramila Parthasarathy
(74) *Attorney, Agent, or Firm* — Zilka-Kotab, PC

(57) ABSTRACT

A system, method, and computer program product are provided for buffering an audio video (AV) stream, audio/video header information, and an audio/video elementary stream for hardware audio/video digital rights management (DRM) processing. In operation, an AV stream encrypted under a shared symmetric key in an M2TS format is buffered, where the AV stream includes content including at least one of audio or video and all content data associated with the AV stream is removed at picture level and below, with the exception of content headers associated with the content data. Additionally, content header information encrypted under the shared symmetric key is buffered, the content header information indicating locations of the content headers associated with the content data. Further, a content elementary stream encrypted under a hardware secret key is buffered for consumption of a hardware bit stream decoding engine.

18 Claims, 4 Drawing Sheets

U.S. PATENT DOCUMENTS

| | | | |
|---|---|---|---|
| 2006/0256105 A1 | 11/2006 | Scarlata et al. |
| 2007/0033419 A1 | 2/2007 | Kocher et al. |
| 2008/0101596 A1 | 5/2008 | Cerruti et al. |
| 2008/0262968 A1 | 10/2008 | Saxena et al. |
| 2010/0146292 A1 | 6/2010 | Shi et al. |
| 2010/0146293 A1 | 6/2010 | Shi et al. |
| 2010/0146501 A1 | 6/2010 | Wyatt et al. |
| 2010/0176920 A1 | 7/2010 | Kursawe et al. |
| 2010/0199104 A1 | 8/2010 | Van Rijnswou |

FOREIGN PATENT DOCUMENTS

| | | |
|---|---|---|
| JP | 2008033584 A | 2/2008 |
| KR | 20060081339 A | 7/2006 |
| WO | 2005001666 A2 | 1/2005 |

OTHER PUBLICATIONS

Non-Final Office Action from U.S. Appl. No. 12/331,242, dated Feb. 3, 2012.

Notice of Allowance from U.S. Appl. No. 12/331,266, dated Nov. 28, 2011.

Supplemental Notice of Allowance from U.S. Appl. No. 12/331,266, dated Jan. 27, 2012.

Notice of Allowance form Korean Application No. 10-2009-0121384, dated Oct. 28, 2011.

Notice of Preliminary Rejection from Korean Application No. 10-2009-0121384, dated Mar. 16, 2011.

Notice of Reasons for Rejection from Japanese Application No. 2009-242567, dated Jul. 12, 2011.

Notice of Final Rejection from Japanese Application No. 2009-242567, Oct. 25, 2011.

Office Action from Chinese Application No. 200910249609.1, Jan. 4, 2012.

U.S. Appl. No. 12/331,266, filed Dec. 9, 2008.

Naor et al., "Revocation and Tracing Schemes for Stateless Receivers," Feb. 14, 2001.

Kivinen et al., "More Modular Exponential (MODP) Diffie-Hellman groups for Internet Key Exchange (IKE)," RFC 3526, May 2003.

"Information technology—Generic coding of moving pictures and associated audio information: Systems," ISO/IEC 13818-1, May 29, 2006.

"Advanced Access Content System (AACS)—Introduction and Common Cryptographic Elements," Feb. 17, 2006.

"Advanced Access Content System (AACS)—Blu-ray Disc Pre-recorded Book," Jul. 27, 2006.

Non-Final Office Action from Application No. 12/331,266 mailed May 12, 2011.

Final Office Action from U.S. Appl. No. 12/331,295, dated Apr. 5, 2012.

Notice of Allowance from U.S. Appl. No. 12/331,242, dated May 15, 2012.

Office Action from Chinese Patent Application No. 200910249609.1, dated Jun. 12, 2012.

Advisory Action from U.S. Appl. No. 12/331,295, dated Jun. 27, 2012.

Written Interrogation from Japanese Patent Application No. 2009-242567, dated Sep. 25, 2012.

Office Action from Chinese Patent Application No. 200910249609.1, dated Nov. 26, 2012.

\* cited by examiner

SYSTEM, METHOD, AND COMPUTER PROGRAM PRODUCT FOR BUFFERING IN ASSOCIATION WITH AUDIO/VIDEO DIGITAL RIGHTS MANAGEMENT (DRM) PROCESSING

FIELD OF THE INVENTION

The present invention relates to digital rights management (DRM) processing, and more particularly to efficiently representing data for hardware associated with such processing.

BACKGROUND

In a system with hardware digital rights management (DRM) processing for protected content, the DRM encrypted audio video (AV) stream is typically decrypted inside a secure embedded processor, for example on graphics processing unit (GPU) hardware, etc. The result is re-encrypted under a symmetric encryption key to insecure memory for consumption by a software player. The symmetric encryption key is shared between the secure embedded processor and the software player via a separate secure key exchange protocol.

Although this system guarantees the security of the video DRM device and sequence keys, as well as the media and title key, a central processing unit (CPU) load may still remain high if an inefficient data representation format is employed for the re-encrypted result of hardware video DRM processing. For example, a naive scheme that re-encrypts the entire AV stream using the Advanced Encryption Standard (AES) would require the software player to decrypt all the data in order to retrieve all non-video packets, as well as to locate all the video headers necessary to correctly schedule decode, render, and display calls.

There is thus a need for addressing these and/or other issues associated with the prior art.

SUMMARY

A system, method, and computer program product are provided for buffering an audio video (AV) stream, audio/video header information, and an audio/video elementary stream for hardware audio/video digital rights management (DRM) processing. In operation, an AV stream encrypted under a shared symmetric key in an M2TS format is buffered, where the AV stream includes content including at least one of audio or video and all content data associated with the AV stream is removed at picture level and below, with the exception of content headers associated with the content data. Additionally, content header information encrypted under the shared symmetric key is buffered, the content header information indicating locations of the content headers associated with the content data. Further, a content elementary stream encrypted under a hardware secret key is buffered for consumption of a hardware bit stream decoding engine.

DETAILED DESCRIPTION

Figure 1:
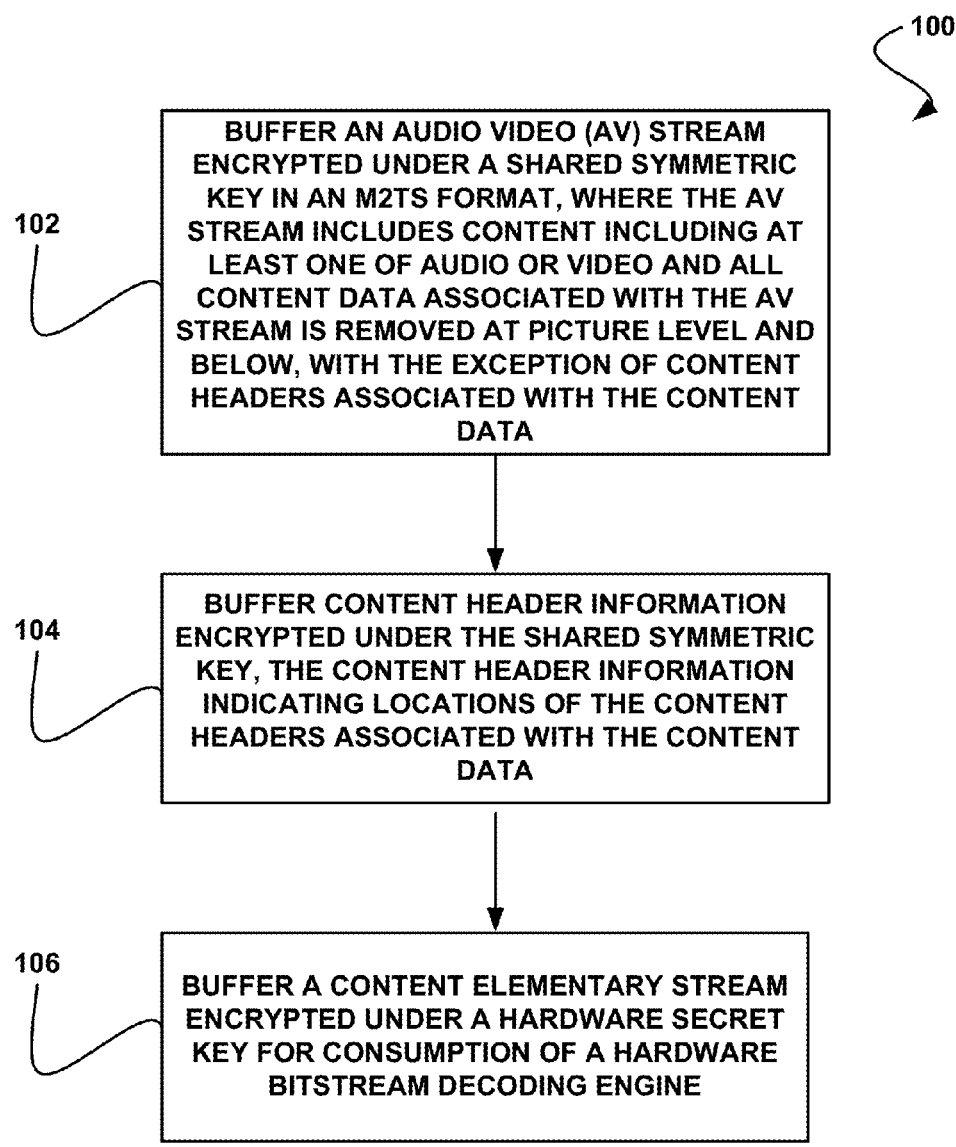
FIG. 1 shows a method for buffering an audio video (AV) stream, audio/video header information, and an audio/video elementary stream for hardware audio/video digital rights management (DRM) processing, in accordance with one embodiment.

FIG. 1 shows a method 100 for buffering an audio video (AV) stream, audio/video header information, and an audio/video elementary stream for hardware audio/video digital rights management (DRM) processing, in accordance with one embodiment. As shown, an AV stream encrypted under a shared symmetric key in an M2TS format is buffered, where the AV stream includes content including at least one of audio or video and all content data associated with the AV stream is removed at picture level and below, with the exception of content headers associated with the content data. See operation 102. In this case, content may refer to audio, video, or both audio and video.

In this case, removing the content data (e.g. video data or audio data) at picture level and below may allow for the content data to remain secure when the shared symmetric key is compromised due to a software hack. In one embodiment, a buffer for buffering the AV stream encrypted under the shared symmetric key in the M2TS format may be a smaller size than an input buffer corresponding to the AV stream. In the context of the present description, the M2TS (.mt2s) format refers to a container file format for multiplexing audio, video, and other streams. The M2TS format is based on the MPEG-2 transport stream container and is also known as BDAV MPEG-2 transport stream.

Content header information (e.g. video header information or audio header information, etc.) encrypted under the shared symmetric key is also buffered, the content header information indicating locations of the content headers associated with the content data. See operation 104. In one embodiment, content header information may include content header indexes indicating locations of the content headers associated with the content data. In another embodiment, the content header information may further indicate at least one of a size or type of the content headers associated with the content data.

As an option, the buffering of the AV stream and the buffering of the content header indexes may be performed utilizing the same buffer. As another option, the buffering of the AV stream and the buffering of the content header information may be performed utilizing a different buffer. In one embodiment, content header indexes included in the content header indexes may be extracted to a separate buffer such that the content headers may be retrieved without decrypting all of the content data.

Furthermore, a content elementary stream (e.g. a video elementary stream, or an audio elementary stream, etc.) encrypted under a hardware secret key is buffered for consumption of a hardware bit stream decoding engine. See operation 106. In one embodiment, the buffering of the AV stream, the content header information, and the content elementary stream may be associated with an output of content DRM [e.g. Advanced Access Content System (AACS), etc.] hardware processing.

In this case, the AACS hardware processing may be associated with a premium content (e.g. a Blu-Ray Disc, etc.) system. In one embodiment, a software player associated with the premium content system may only decrypt transport stream (TS) packet headers and adaptation data, a non-content packet payload, and the content headers. Of course, the software player may be configured to decrypt various information in different embodiments.

It should be noted that the method 100 may be implemented such that content DRM processing may be offloaded. In various embodiments, this content DRM processing may include the processing of optical media (e.g. Blu-Ray, etc.), or Internet content.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
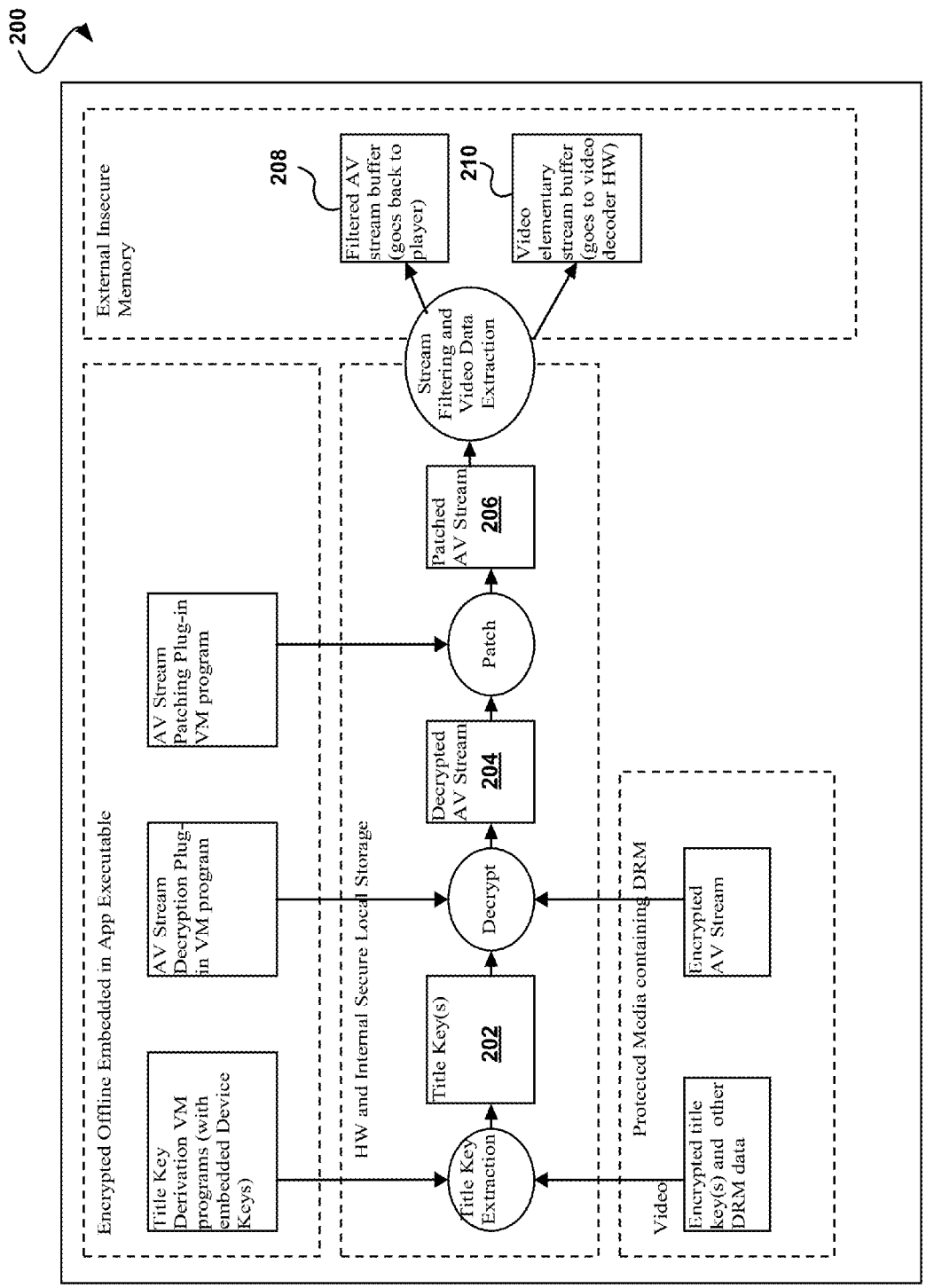
FIG. 2 shows a system flow for buffering an AV stream, audio/video header information, and an audio/video elementary stream for hardware audio/video DRM processing, in accordance with one embodiment.

FIG. 2 shows a system flow 200 for buffering an AV stream, audio/video header information, and an audio/video elementary stream for hardware audio/video DRM processing, in accordance with one embodiment. As an option, the present system flow 200 may be implemented in the context of the details of FIG. 1. Of course, however, the system flow 200 may be implemented in any desired environment. It should also be noted that the aforementioned definitions may apply during the present description.

In one embodiment, the system flow 200 may be implemented using a Secure Execution CPU Offload Processor (SECOP) engine, which may be an embedded general-purpose microprocessor on a GPU. In operation, a player session key may be established. In this case, a software player and hardware may participate in a two-way authenticated key exchange protocol to establish a shared symmetric key referred to as the player session key. The protocol may be utilized to ensure that only legitimate software can utilize the hardware security processing capabilities, and to thwart attempts to create a circumvention device. The player session key may be used to encrypt and authenticate subsequent communication between the software player and the hardware.

As shown, title keys 202 may be derived as part of the system flow 200. The derivation of the title keys 202 may require various secret values, including device keys, as well as the encrypted title keys and other auxiliary data from the storage media. This should occur before playback. It may only be needed during initialization for a volume. It should be noted that this may yield more than one title key if the media contains more than one protected unit.

After title keys are derived, the title keys 202 may be stored in secure write-only key registers to enable AV stream decryption. AV decryption decrypts the encrypted AV streams, resulting in decrypted AV streams 204. The result of the decryption may be temporarily stored in the secure local data storage for further processing.

AV bit stream patching performs any intermediate bit stream transform operations required by the protected media. After this, the AV stream may be decrypted and patched, resulting in a patched AV stream 206. The result of the patching may also be temporarily stored in the secure local data storage for further processing.

Stream filtering and audio/video data extraction may be utilized to parse the transport stream packets and produce two different re-encrypted output buffers, a filtered AV stream buffer 208, and a audio/video elementary stream buffer 210. For the filtered AV stream buffer 208, the hardware may filter the AV bit stream by removing slice-level audio/video data from the decrypted and patched AV bit stream and may replace the removed data with a specially encoded descriptor. The resulting filtered bit stream may be re-encrypted under the player session key. For the audio/video elementary stream buffer 210, the hardware may extract the audio/video elementary stream data from the main and secondary audio/video packet and may re-encrypt the result under a hardware secret key for consumption by the hardware bit stream decoder.

In one embodiment, after decryption and bit stream patching, the decrypted AV stream 204 may be in the format of MPEG-2 Transport Stream. This stream may contain video, audio, subtitles, graphics, navigation, and other system packets. The non-video packets such as audio and subtitles, in addition to a small amount of video metadata, may be sent back to the software player for further processing on the CPU.

The data needed by the software player may be sent back in a "filtered" M2TS transport stream. On the other hand, the video bit stream may be extracted to the video elementary stream buffers 210 and directly consumed by the bit stream decoding engine of the GPU.

The SECOP engine may differentiate the type of the packets by inspecting the PID field in each transport packet. In one embodiment, all non-video packets, except for the system use descriptors in PMT packets, may be left intact in the decrypted and patched AV stream, which may be re-encrypted under the player session key. As an option, the SECOP hardware may erase the system use descriptors in PMT packets.

In one embodiment, the software player may decrypt this data on the CPU and then process the data. For most titles, the size of non-video packets may only take up a small percentage of all transport packets. Therefore, encryption-related CPU utilization and power consumption may be reduced significantly.

For video packets in the decrypted and patched AV stream, several steps of data extraction may be performed. For example, the SECOP may concatenate the payload from all video packets to obtain the video elementary stream. This may be re-encrypted under a hardware secret key (e.g. shared between the SECOP hardware and the hardware bit stream decoder) and output to the video elementary stream buffer 210.

The SECOP may then remove slice-level video data from the decrypted and patched AV stream. Such data is generally not needed by the software player to perform video playback. This may be implemented to guarantee that the CPU has no access to the decrypted video stream data.

However, the software player may still obtain certain high-level information about the video streams in order to provide correct DXVA DecodeExecute call parameters, to schedule decoding, rendering, and presentation in the correct order, as well as to accurately synchronize video and audio. Therefore, the SECOP may re-encrypt this small amount of metadata information that contains the PES headers, the sequence-level and picture-level headers, as well as user-defined headers, under the player session key, along with the non-video packets.

In various embodiments, the SECOP hardware may use different techniques to locate packets containing only slice-level video data. For example, in one embodiment, the SECOP may scan the video packets for start codes (e.g. any "00 00 01 XX" byte sequence, etc.). When the start code values illustrated in Table 1 are encountered, the SECOP may treat all succeeding data bytes (including the start code itself) as slice-level data until the hardware encounters another start code or reaches the end of a PES packet.

TABLE 1

| Codec Type | Start code values |
|---|---|
| H.264 | 0x01, 0x05, 0x21, 0x25, 0x41, 0x45, 0x61, 0x65 |
| MPEG-2 | 0x01 through 0xAF |
| VC-1 | 0x0B, 0x0C, 0x0D |

Lastly, the SECOP hardware may insert special descriptors for each erased slice in place of the removed slice-level data. To avoid major architectural changes in the software player, the SECOP shall provide this information in-band. In other words, the erased slice descriptors may be encoded in the filtered AV bit stream as part of the video PES packet. As an option, the descriptor may include the start code, size, as well as a small amount of metadata for the software player.

Figure 3:
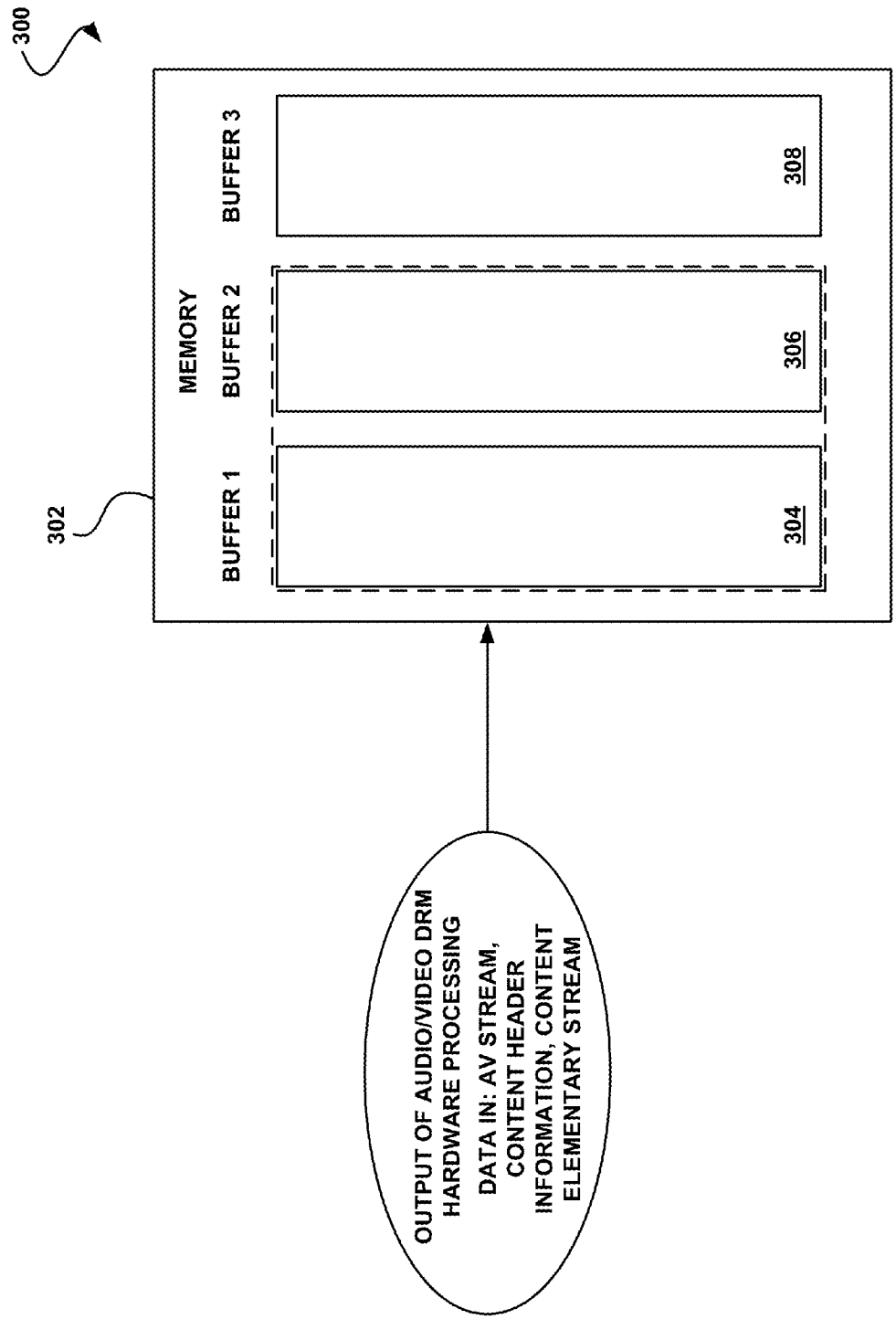
FIG. 3 shows a system for buffering an AV stream, audio/video header information, and an audio/video elementary stream for hardware audio/video DRM processing, in accordance with one embodiment.

FIG. 3 shows a system 300 for buffering an AV stream, audio/video header information, and an audio/video elementary stream for hardware audio/video DRM processing, in accordance with another embodiment. As an option, the present system 300 may be implemented in the context of the functionality and architecture of FIGS. 1-2. Of course, however, the system 300 may be implemented in any desired environment. Again, the aforementioned definitions may apply during the present description.

As shown, the system 300 may include memory 302. The memory 302 may include a plurality of buffers 304-308. In operation, an efficient data representation scheme for a re-encrypted result of hardware content DRM processing may be implemented. As an option, the output of the DRM hardware processing may include three buffers. A first buffer 302 may include an AV stream encrypted under the shared symmetric key in the M2TS format with exactly the same size, or a smaller size, than an input buffer, but with all the content data (e.g. excluding content headers) removed at picture level and below. In this case, the removed data may be removed or erased.

A second buffer 304 may include a content header information (e.g. indexes, etc.) buffer encrypted under the shared symmetric key containing the locations of all content headers corresponding to the content data in the first buffer. It should be noted that, in one embodiment, the data from the first buffer 302 and the data from second buffer 304 may be stored in a single buffer. A third buffer 308 may include a content elementary stream buffer encrypted under a hardware secret key for consumption of a hardware bit stream decoding engine.

Thus, with the assistance from content header index information extracted to a separate buffer, the software player does not need to decrypt all the data to retrieve content headers. The software player only needs to decrypt TS packet headers and adaptation data, non-content packet payload, and content headers. In most cases, the amount of data in these three parts equals roughly 10% ~20% of the total AV stream. Therefore, 80% ~90% of the CPU load related to decryption may be conserved.

Furthermore, with the content data (excluding content headers) removed at picture level and below, the content data remains secure even when the shared symmetric key is compromised due to a software hack. The actual content elementary stream data is encrypted under a hardware secret key and is secure against software hacks.

Figure 4:
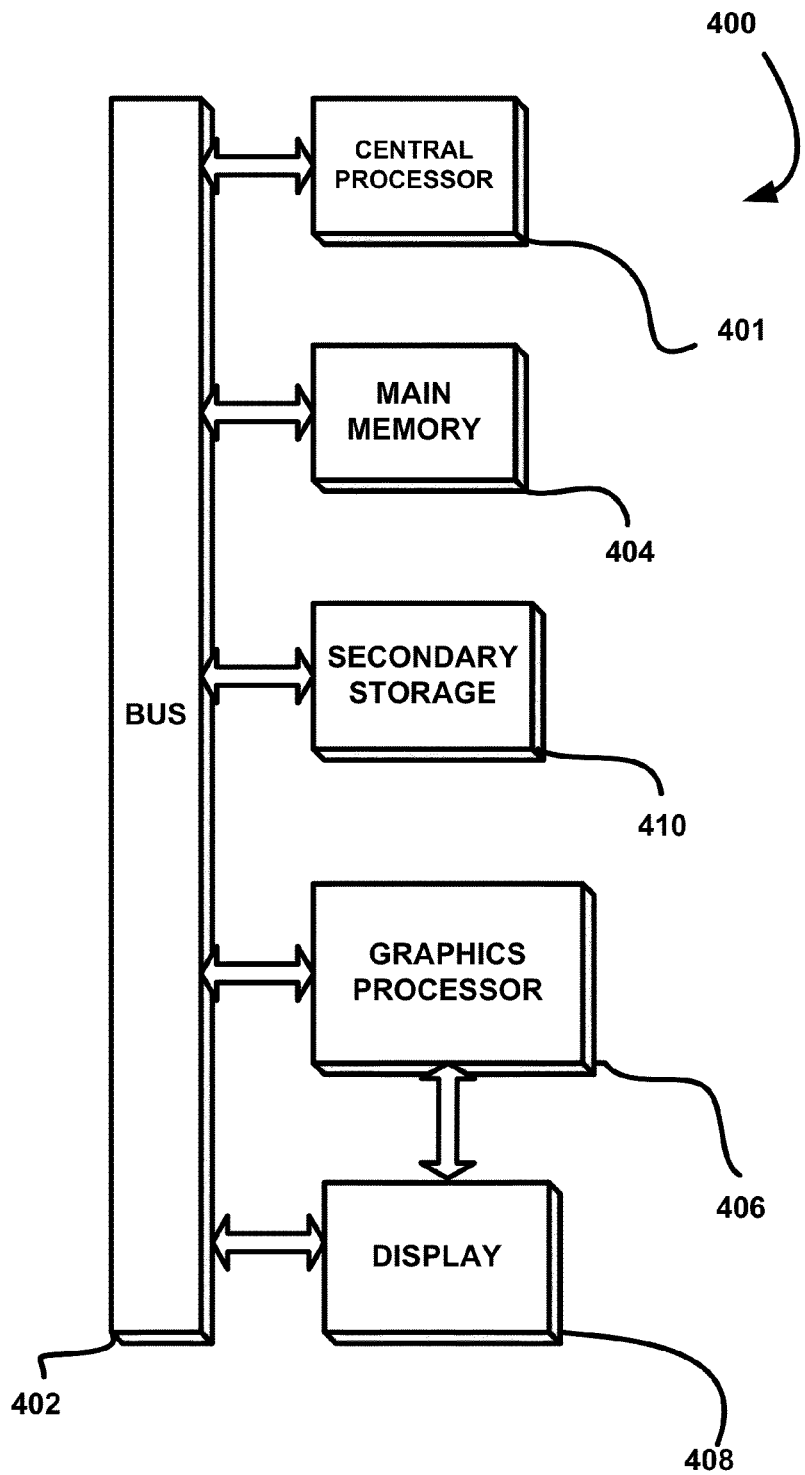
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices including, but not limited to, a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    buffering in a first buffer an audio video (AV) stream encrypted under a shared symmetric key in an M2TS format, where all content data of the AV stream at picture level and below, with the exception of content headers of the content data, is excluded from the buffering;
    buffering in a second buffer content header information encrypted under the shared symmetric key, the content header information indicating locations of the buffered content headers, such that the buffered content header information is usable as an index for locating the buffered content headers to allow retrieval of the buffered content headers without decryption of an entirety of the buffered content data; and buffering in a third buffer a content elementary stream encrypted under a hardware secret key for consumption of a hardware bit stream decoding engine;

wherein the buffering of the AV stream, the content header information, and the content elementary stream is a result of content digital right management (DRM) hardware processing and is at least in part for use by a software player.

2. The method of claim 1, wherein the first buffer for buffering the AV stream encrypted under the shared symmetric key in the M2TS format is a smaller size than an input buffer corresponding to the AV stream.

3. The method of claim 1, wherein the buffering of the AV stream to the first buffer and the buffering of the content header information to the second buffer are performed utilizing the same buffer such that the first buffer and the second buffer are the same buffer.

4. The method of claim 1, wherein the content DRM hardware processing is associated with a premium Blu-Ray Disc content system.

5. The method of claim 4, wherein the software player associated with the Blu-Ray Disc content system only decrypts transport stream (TS) packet headers and adaptation data, a non-content packet payload, and the content headers of the AV stream.

6. The method of claim 1, wherein a software hack which compromises the shared symmetric key occurs after the exclusion of the content data of the AV stream at picture level and below, and the content data remains secure when the shared symmetric key is compromised by the software hack.

7. The method of claim 1, wherein the buffered content header information includes content header indexes indicating locations of the buffered content headers associated with the buffered content data.

8. The method of claim 7, wherein the software player utilizes the content header indexes of the buffered content header information to avoid decrypting the content data of the AV stream in order to retrieve the buffered content headers.

9. The method of claim 1, wherein the buffered content header information further indicates at least one of a size or type of the buffered content headers associated with the buffered content data.

10. The method of claim 1, wherein all of the content data of the AV stream at picture level and below is removed from the AV stream and excluded from the buffering such that the removed content data remains secure when the shared symmetric key is compromised.

11. The method of claim 1, wherein the software player uses the content header information to retrieve the buffered content headers.

12. The method of claim 11, wherein the software player decrypts the buffered content headers upon retrieval thereof.

13. A computer program product embodied on a non-transitory computer readable medium, comprising:
    computer code for buffering in a first buffer an audio video (AV) stream encrypted under a shared symmetric key in an M2TS format, where all content data of the AV stream at picture level and below, with the exception of content headers of the content data, is excluded from the buffering;
    computer code for buffering in a second buffer content header information encrypted under the shared symmetric key, the content header information indicating locations of the buffered content headers, such that the buffered content header information is usable as an index for locating the buffered content headers to allow retrieval of the buffered content headers without decryption of an entirety of the buffered content data; and
    computer code for buffering in a third buffer a content elementary stream encrypted under a hardware secret key for consumption of a hardware bit stream decoding engine;
    wherein the computer program product is operable such that the buffering of the AV stream, the content header information, and the content elementary stream is a result of content digital right management (DRM) hardware processing and is at least in part for use by a software player.

14. The computer program product of claim 13, wherein the computer program product is operable such that the first buffer for buffering the AV stream encrypted under the shared symmetric key in the M2TS format is a smaller size than an input buffer corresponding to the AV stream.

15. The computer program product of claim 13, wherein the computer program product is operable such that the buffering of the AV stream to the first buffer and the buffering of the content header information to the second buffer are performed utilizing the same buffer such that the first buffer and the second buffer are the same buffer.

16. An apparatus, comprising:
    at least one first buffer for buffering an audio video stream encrypted under a shared symmetric key in an M2TS format, where all content data of the AV stream at picture level and below, with the exception of content headers of the content data, is excluded from the buffering;
    at least one second buffer for buffering content header information encrypted under the shared symmetric key, the content header information indicating locations of the buffered content headers, such that the buffered content header information is usable as an index for locating the buffered content headers to allow retrieval of the buffered content headers without decryption of an entirety of the buffered content data; and
    at least one third buffer for buffering a content elementary stream encrypted under a hardware secret key for consumption of a hardware bit stream decoding engine;
    wherein the apparatus is operable such that the buffering of the AV stream, the content header information, and the content elementary stream is a result of content digital right management (DRM) hardware processing and is at least in part for use by a software player.

17. The apparatus of claim 16, wherein the apparatus is configured such that the at least one first buffer for buffering the AV stream encrypted under the shared symmetric key in the M2TS format is a smaller size than an input buffer corresponding to the AV stream.

18. The apparatus of claim 16, wherein the apparatus is configured such that the buffering of the AV stream utilizing the at least one first buffer and the buffering of the content header information utilizing the at least one second buffer are performed utilizing the same buffer such that the at least one first buffer and the at least one second buffer are the same buffer.

* * * * *